(12) United States Patent
Huang et al.

(10) Patent No.: US 8,464,395 B2
(45) Date of Patent: Jun. 18, 2013

(54) MULTI-DIRECTIONAL HINGE MECHANISM

(75) Inventors: Lian-Cheng Huang, Shenzhen (CN); Shen Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/296,177

(22) Filed: Nov. 14, 2011

(65) Prior Publication Data

US 2012/0324675 A1 Dec. 27, 2012

(30) Foreign Application Priority Data

Jun. 21, 2011 (CN) .......................... 2011 1 0167271

(51) Int. Cl.
*E05D 3/10* (2006.01)
*E05D 11/08* (2006.01)

(52) U.S. Cl.
USPC ............................................. 16/367; 16/342

(58) Field of Classification Search
USPC ................... 16/367, 374, 371, 380, 381, 342; 379/433.11, 433.13; 455/575.3
See application file for complete search history.

(56) References Cited

U.S. PATENT DOCUMENTS

| | | | |
|---|---|---|---|
| 5,109,572 A * | 5/1992 | Park .................. | 16/334 |
| 5,600,870 A * | 2/1997 | Fields et al. ............ | 16/342 |
| 6,305,050 B1 * | 10/2001 | Imai .................. | 16/303 |
| 6,647,593 B2 * | 11/2003 | Iguchi et al. ............ | 16/386 |
| 6,742,221 B2 * | 6/2004 | Lu et al. .............. | 16/367 |
| 6,772,481 B2 * | 8/2004 | Oshima et al. ........... | 16/330 |
| 6,785,936 B2 * | 9/2004 | Koshikawa ............. | 16/328 |
| 6,804,861 B2 * | 10/2004 | Hsu .................. | 16/366 |
| 6,832,411 B2 * | 12/2004 | Koshikawa et al. ........ | 16/330 |
| 6,845,546 B1 * | 1/2005 | Lu et al. .............. | 16/367 |
| 6,912,122 B2 * | 6/2005 | Chen et al. ............. | 361/679.27 |
| 6,958,902 B2 * | 10/2005 | Tseng et al. ............ | 361/679.06 |
| 7,133,280 B2 * | 11/2006 | Love .................. | 361/679.07 |
| 7,251,859 B2 * | 8/2007 | Oshima et al. ........... | 16/330 |
| 7,320,153 B2 * | 1/2008 | Watanabe et al. ......... | 16/367 |
| 7,386,918 B2 * | 6/2008 | Tomizawa ............. | 16/303 |
| 7,530,144 B2 * | 5/2009 | Lu et al. .............. | 16/342 |
| 7,574,774 B2 * | 8/2009 | Chang et al. ........... | 16/367 |
| 7,591,047 B2 * | 9/2009 | Chang et al. ........... | 16/367 |
| 7,600,298 B2 * | 10/2009 | Chen et al. ............ | 16/367 |
| 7,607,201 B2 * | 10/2009 | Lin .................. | 16/330 |
| 7,610,658 B2 * | 11/2009 | Lee et al. ............. | 16/367 |
| 7,665,186 B2 * | 2/2010 | Hill .................. | 16/374 |
| 7,690,082 B2 * | 4/2010 | Chuang ............... | 16/367 |
| 7,706,137 B2 * | 4/2010 | Iijima et al. ............ | 361/679.07 |
| 7,784,156 B2 * | 8/2010 | Sugimura et al. .......... | 16/367 |
| 7,979,961 B2 * | 7/2011 | Wang et al. ............ | 16/367 |
| 7,984,533 B2 * | 7/2011 | Wei et al. ............. | 16/367 |
| 7,987,559 B2 * | 8/2011 | Chou ................. | 16/367 |
| 8,082,633 B2 * | 12/2011 | Mizuta et al. ........... | 16/374 |
| 8,096,021 B2 * | 1/2012 | Iwama et al. ........... | 16/367 |
| 8,161,604 B2 * | 4/2012 | Lin et al. .............. | 16/367 |
| 8,209,817 B2 * | 7/2012 | Shen ................. | 16/342 |
| 8,250,709 B2 * | 8/2012 | Jou .................. | 16/330 |
| 8,300,391 B2 * | 10/2012 | Hu ................... | 361/679.07 |
| 8,307,511 B2 * | 11/2012 | Li et al. ............... | 16/367 |
| 2008/0034546 A1 * | 2/2008 | Hsu .................. | 16/367 |

(Continued)

*Primary Examiner* — Victor Batson
*Assistant Examiner* — Jason W San
(74) *Attorney, Agent, or Firm* — Altis Law Group, Inc.

(57) ABSTRACT

A multi-directional hinge mechanism includes a pair of first rotating assemblies, a second rotating assembly and a connecting member, and is capable of functioning on two perpendicularly-opposed axes.

18 Claims, 6 Drawing Sheets

U.S. PATENT DOCUMENTS

| | | | |
|---|---|---|---|
| 2008/0078062 A1* | 4/2008 | Hsu et al. | 16/367 |
| 2008/0078063 A1* | 4/2008 | Chang et al. | 16/367 |
| 2008/0115325 A1* | 5/2008 | Chien | 16/367 |
| 2008/0271293 A1* | 11/2008 | Hsu et al. | 16/367 |
| 2010/0095486 A1* | 4/2010 | Chou | 16/348 |
| 2011/0308043 A1* | 12/2011 | Nakasone | 16/380 |

* cited by examiner

MULTI-DIRECTIONAL HINGE MECHANISM

BACKGROUND

1. Technical Field

The present disclosure relates to hinge mechanisms, and more particularly, to a multi-directional hinge mechanism capable of rotating around a multi-directions.

2. Description of Related Art

A commonly used electronic device includes a liquid crystal display and a multi-directional hinge mechanism. The electronic device opens and closes via the multi-directional hinge mechanism to enable the crystal display to be viewed from many angles, thus the electronic device obtains a high degree of maneuverability and convenience.

However, such a multi-directional hinge mechanism as used in the electronic device is made of metallic material and includes a fixing member, a first pivotal assembly and a second pivotal assembly. The first and second pivotal assemblies generally include many components, thus the multi-directional hinge mechanism becomes complicated and unable to satisfy the demand for lightness and thinness.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
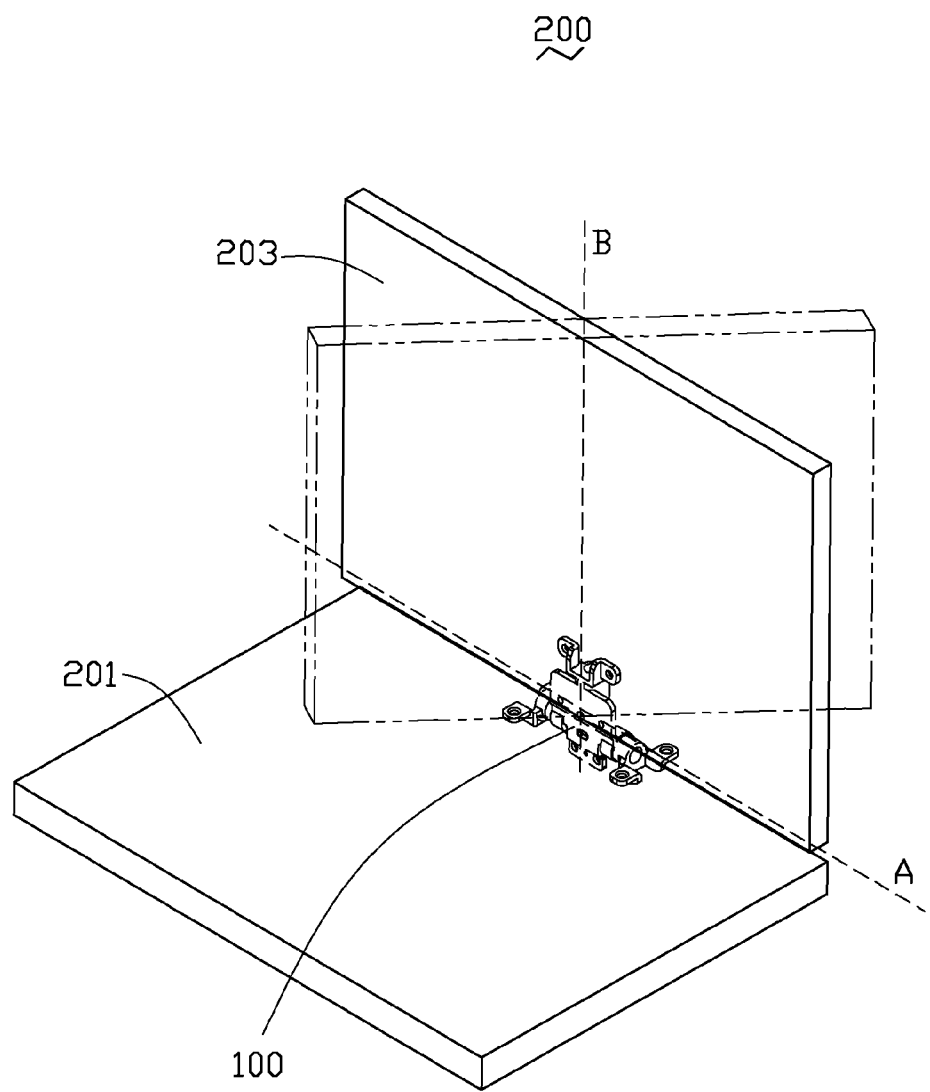
FIG. 1 is an isometric view of an embodiment of an electronic device using a multi-directional hinge mechanism.

Referring to FIG. 1, an embodiment of an electronic device 200 includes a main body 201, a display 203 and a multi-directional hinge mechanism 100. The multi-directional hinge mechanism 100 is mounted between the main body 201 and the display 203. The display 203 is capable of rotating relative to the main body 201 along an axis A or B or both. In the embodiment, the electronic device 100 is a notebook computer.

Figure 2:
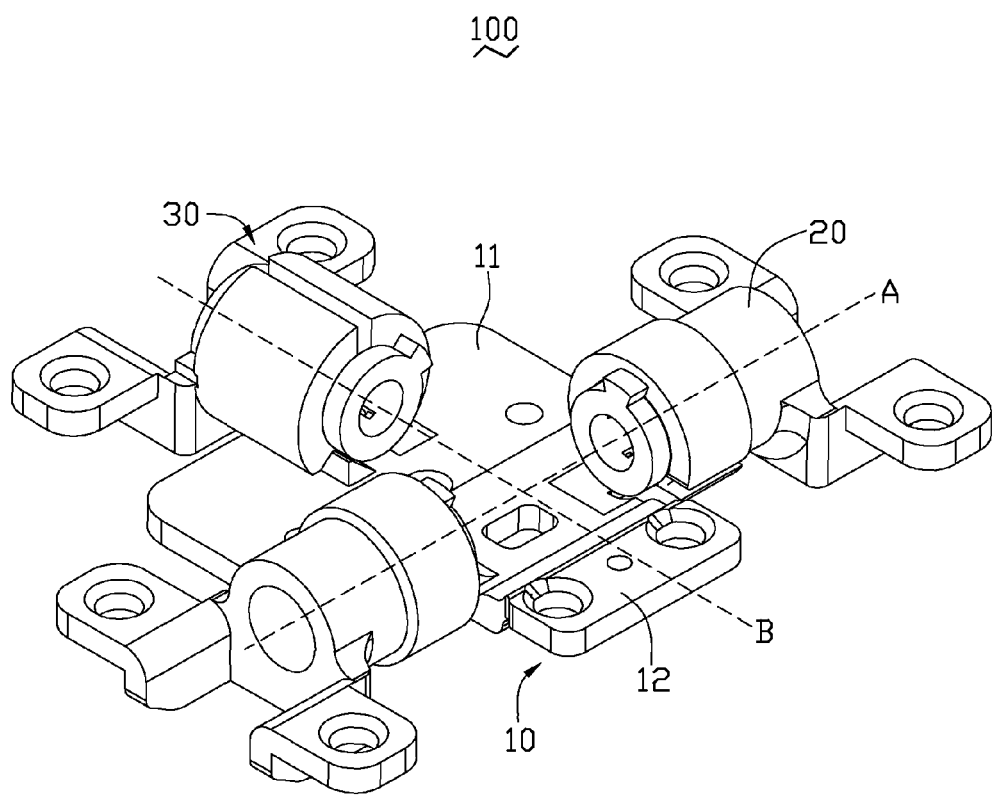
FIG. 2 is an isometric view of the multi-directional hinge mechanism of FIG. 1.

Referring to FIG. 2, the multi-directional hinge mechanism 100 includes a connecting member 10, a pair of first pivotal assemblies 20, and a second pivotal assembly 30. Each first pivotal assembly 20 is connected to the main body 201, the second pivotal assembly 30 is connected to the display 203.

Figure 3:
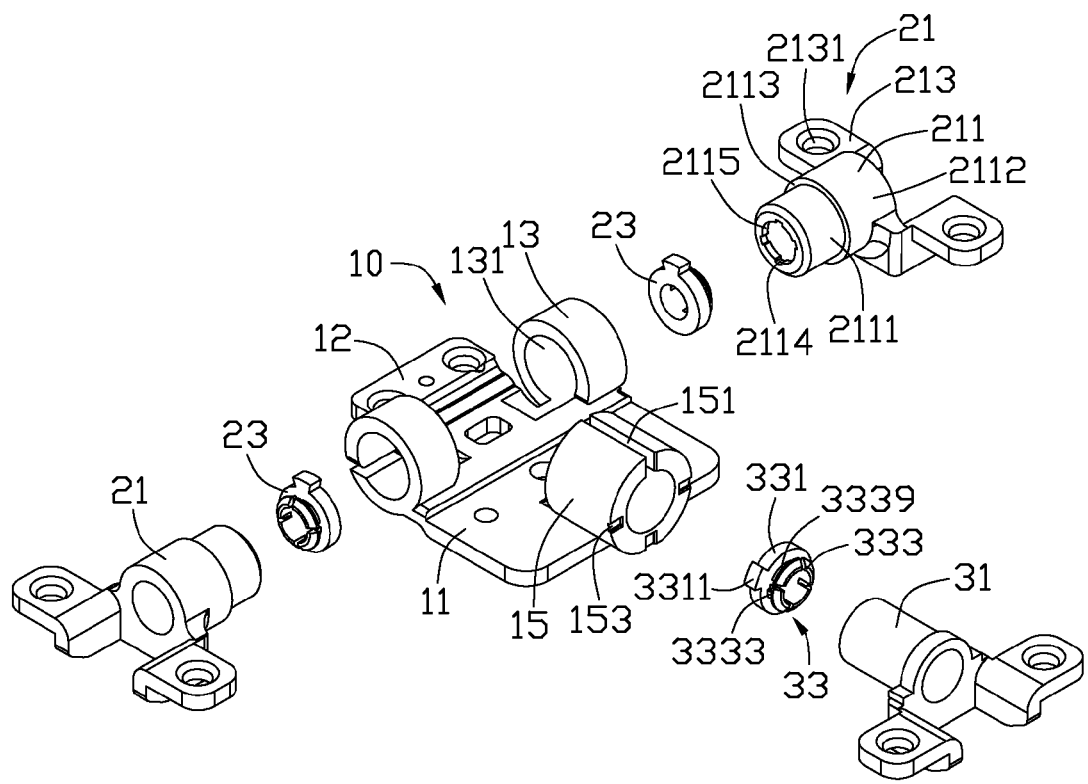
FIG. 3 is an exploded, isometric view of the multi-directional hinge mechanism of FIG. 1.

Also referring to FIG. 3, the connecting member 10 includes a base body 11, a connecting sheet 12 extending from a side of the base body 11, a pair of first wrapping portions 13 aligned along the axis A, and a second wrapping portion 15 coaxial with the axis B. The first wrapping portions 13 are symmetrically disposed on the connecting sheet 12. The second wrapping portion 15 is at the far end of the base body 11, away from the connecting sheet 12, and the plane of the longitudinal axis of the second wrapping portion 15 meeting the base body 11 at right angles divides the body 11 into equal symmetrical parts. The axis A is substantially perpendicular to the axis B. The first wrapping portion 13 is substantially cylindrical and defines a through hole 131 coaxial with the axis A. The through hole 131 extends through the two end surfaces of the wrapping portion 13. The second wrapping portion 15 is cylindrical and defines a through hole 151 coaxial with the axis B. The through hole 151 extends through the two end surfaces of the second wrapping portion 15. The second wrapping portion 15 defines a plurality of grooves 153 in the end surface furthest from the connecting sheet 12. The pair of first wrapping portions 13 connects with the pair of first pivotal assemblies 20. The second wrapping portion 15 is connected to the second pivotal assembly 30.

The first pivotal assembly 20 includes a first rotating bracket 21 and a first latching member 23. The first rotating bracket 21 includes a shaft 211 and a pair of first connecting portions 213 extending from opposite sides of the shaft 211. The shaft 211 is a substantially hollow cylinder and includes a first shaft portion 2111, a second shaft portion 2112, and a stepped surface 2113 located between the first shaft portion 2111 and the second shaft portion 2112. The diameter of the first shaft portion 2111 is greater than that of the second shaft portion 2112. The diameter of the first shaft portion 2111 is greater than the internal diameter of the first wrapping portion 13, such that the shaft 211 is a close fit in the first wrapping portion 13. The shaft 211 further includes an annular latching portion 2114 at the end opposite to the pair of first connecting portions 213. The latching portion 2114 defines a plurality of positioning grooves 2115 around the inner wall thereof. In the illustrated embodiment, the latching portion 2114 defines four positioning grooves 2115 therein. Each first connecting portion 213 defines a connecting hole 2131 to enable the latching assembly 20 to be connected to the main body 201.

Figure 4:
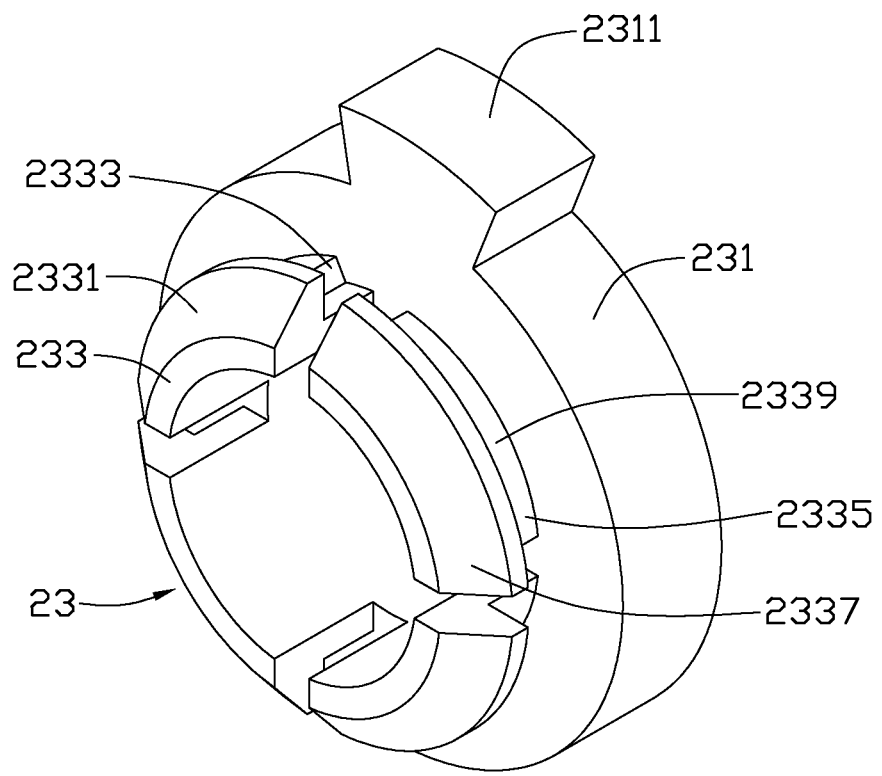
FIG. 4 is an isometric view of a first latching member of FIG. 3.
Figure 6:
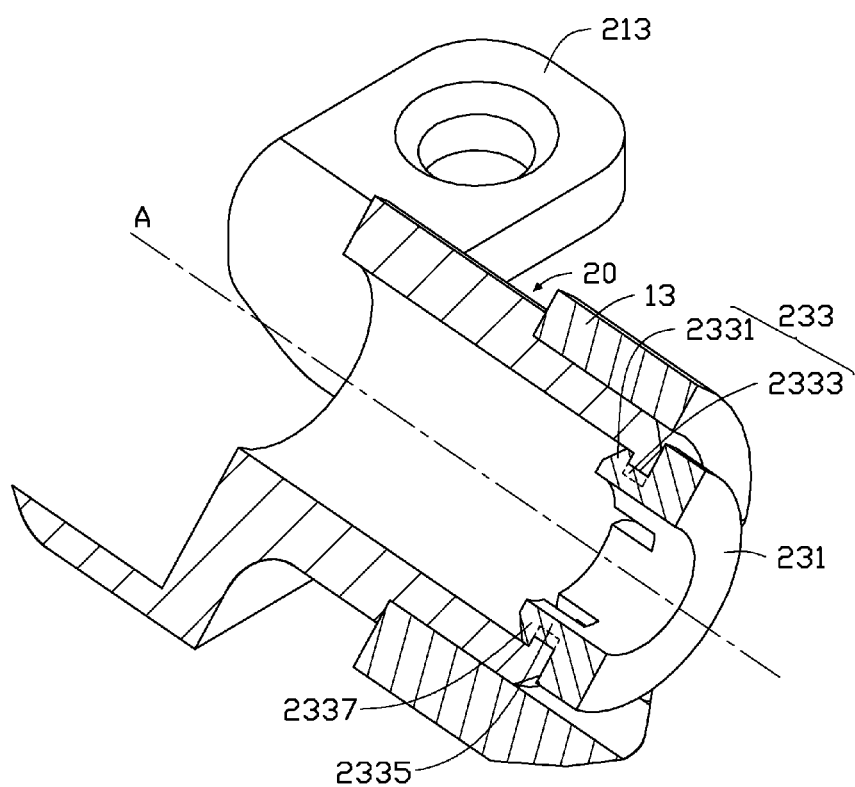
FIG. 6 is a part of sectional view of the multi-directional hinge mechanism of FIG. 2.

Referring to FIG. 4 and FIG. 6, the first latching member 23 includes a base 231 and a latching portion 233 located on an end surface of the base 231. The base 231 is substantially annular and includes a restricting protrusion 2311 radiating from the base 231. The restricting protrusion 2311 on each base 231 points in the same direction. The latching portion 233 includes a plurality of claws 2331 located on the end surface of the base 231 and a pair of positioning blocks 2333 located underneath the claws 2331. The plurality of claws 2331 are arranged peripherally on the end surface of the base 231. Each claw 2331 includes a base portion 2335 formed on the end surface of the base 231 and a head portion 2337 connected to the top of the base portion 2335. Each head portion 2337 and the base 231 cooperatively define a latching groove 2339. The latching portion 2114 is capable of engaging with the latching groove 2339. Each positioning block 2333 is disposed in the latching groove 2339. In the illustrated embodiment, the first latching member 23 includes four claws 2331 and two positioning blocks 2333. The total number of the claws 2331 and of the positioning blocks 2333 can be changed.

Referring to FIG. 3 again, the second pivotal assembly 30 includes a second rotating bracket 31 and a second latching member 33.

Figure 5:
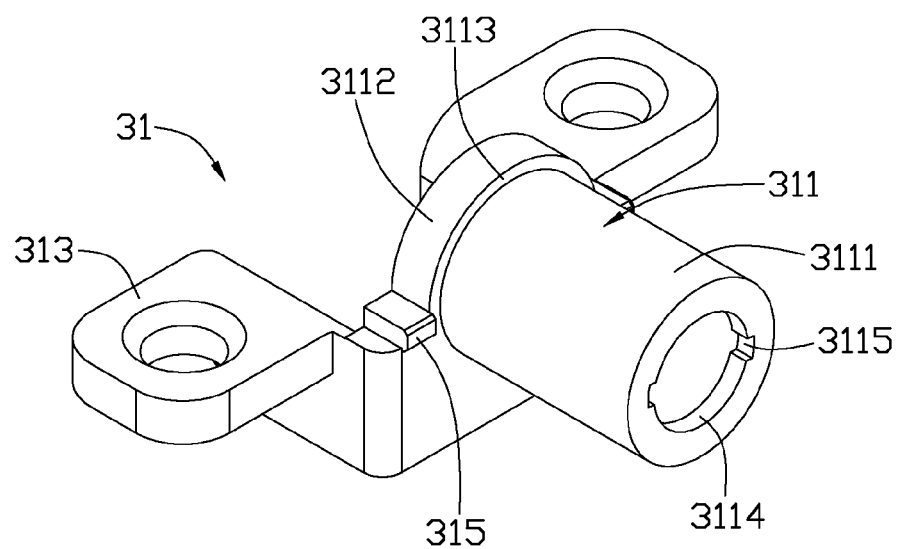
FIG. 5 is an isometric view of a second rotating bracket of FIG. 3.

Also referring to FIG. 5, the second rotating bracket 31 includes a shaft 311 and a pair of second connecting portions 313 extending from opposite sides of the shaft 311. The shaft 311 is hollow and includes a first shaft portion 3111, a second shaft portion 3112, and a stepped surface 3113 located between the first shaft portion 3111 and the second shaft portion 3112. The diameter of the second shaft portion 3112 is greater than that of the first shaft portion 3111. The diameter of the first shaft portion 3111 is greater than the internal diameter of the second wrapping portion 15 to enable a close fit by the shaft 311 in the second wrapping portion 15. The first shaft portion 3111 further includes an annular latching portion 3114. The latching portion 3114 defines two positioning grooves 3115 around the inner wall thereof. The pair of second connecting portions 313 includes two protrusions 315 adjacent to the stepped surface 3113. The two protrusions 315 are symmetrical relative to the shaft 311 and are capable of engaging in the grooves 153 of the second wrapping portion 15 respectively.

Referring to FIG. 3 again, the second latching member 33 is similar to the first latching member 23. The second latching member 33 includes a base 331 and a latching portion 333 located on an end surface of the base 331. The base 331 is substantially annular and includes a restricting protrusions 3311 radiating from the base 331. The restricting protrusions 3311 on each base 331 point in the same direction. The latching portion 333 includes a plurality of claws 3331 located on the end surface of the base 331 and a pair of positioning blocks 3333 located underneath the claws 3331. The plurality of claws 3331 are arranged peripherally the end surface of the base 331. Each claw 3331 includes a base portion (not labeled) formed on the end surface of the base 331 and a head portion (not labeled) connected to the base portion. Each head portion and the base 331 cooperatively define a latching groove 3339. The latching portion 3114 of the second pivotal assembly 30 is capable of engaging with the latching groove 3339. Each positioning block 3333 is disposed in the latching groove 3339.

In assembly, the first shaft portion 2111 of the first rotating bracket 21 is extended into the first wrapping portions 13 until the stepped surface 2113 abuts an end surface of the first wrapping portions 13. The through hole 131 of the first wrapping portions 13 is elastically expanded to enable the first shaft portion 2111 to engage in the first wrapping portions 13 tightly, such that the first rotating bracket 21 is capable of rotating about the axis A, and being positioned at any angle. The latching portion 233 of the first latching member 23 is extended into the first wrapping portion 13 at the end opposite to the first rotating bracket 21. The restricting protrusions 2311 abut the end surface of the first wrapping portion 13. The latching portions 2114 engage with the latching grooves 2339 and the positioning blocks 2333 engage with the positioning grooves 2115 respectively to connect the first rotating bracket 21 to the first latching member 23. The stepped surface 2113 abuts an end surface of the first wrapping portion 13, the restricting protrusions 2311 resist against the opposite end surface of the first wrapping portion 13, such that the first rotating bracket 21 is prevented from sliding out of the first wrapping portion 13 when the first rotating bracket 21 rotates relative to the first wrapping portion 13.

The first shaft portion 3111 of the second rotating bracket 31 is extended into the second wrapping portions 15 until the stepped surface 3113 abuts an end surface of the second wrapping portions 15. The second rotating bracket 31 is rotated until the protrusions 315 engage in the grooves 153 respectively. The through hole 151 of the second wrapping portions 15 is elastically expanded to enable the first shaft portion 3111 to engage in second wrapping portions 15 tightly, such that the second rotating bracket 31 is capable of rotating along the axis B and being positioned at any angle. The latching portion 333 of the second latching member 33 is extended into the second wrapping portions 15 at the end opposite to the second rotating bracket 31. The restricting protrusions 3311 abut against an end surface of the second wrapping portions 15. The latching portions 3114 engage with the latching grooves 3339 and the positioning blocks 3333 engage with the positioning grooves 3115 respectively to connect the second rotating bracket 31 to the second latching member 33. The stepped surface 3113 abuts an end surface of the second wrapping portion 15, the restricting protrusions 3311 resist against the opposite end surface of the second wrapping portion 15, such that the second rotating bracket 31 is prevented from sliding out of the second wrapping portion 15 when the second rotating bracket 31 rotates relative to the second wrapping portion 15. The protrusions 315 engage in the grooves 153, such that a better touch and feel can be obtained when the second rotating bracket 31 is rotated relative to the second wrapping portion 15, and the angle of rotation can be sensed clearly.

The first rotating bracket 21 is connected to the main body 201 of the electronic device 200, the second rotating bracket 31 is connected to the display 203 of the electronic device 200. When manual force is applied on the top or to a side of the display 203, the display 203 rotates relative to the main body 201 along the axis A via the first rotating bracket 21, and thus the electronic device is opened. The display 203 may be rotated relative to the main body 201 along the axis B via the second rotating bracket 31, and thus the display 203 can be angled horizontally as well as vertically to suit the user.

The multi-directional hinge mechanism 100 is made of plastic materials by injection molding, such that the multi-directional hinge mechanism 100 is light and capable of easy fabrication. The multi-directional hinge mechanism 100 is made of a particular plastic material(s), such that the first wrapping portions 13, the second wrapping portion 15, the first rotating bracket 21 and the second rotating bracket 31 are both elastic but not friction-free, to enable the first rotating bracket 21 to stay at any angle into which the mechanism 100 is maneuvered by a user. The multi-directional hinge mechanism 100 is also subject to friction when the second rotating bracket 31 is rotated relative to the second wrapping portions 15. The rotation between the first rotating bracket 21 and the first wrapping portions 13, the second rotating bracket 31 and the second wrapping portions 15 are smoother and freer.

The display 203 of the electronic device 200 can be opened by and rotated on the multi-directional hinge mechanism 100. The multi-directional hinge mechanism 100 just includes a connecting member 10, a first rotating bracket 21, a first latching member 23, a second rotating bracket 31 and a second latching member 33, thus the multi-directional hinge mechanism 100 is simple and can be assembled easily.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A multi-directional hinge mechanism, comprising:
   two first rotating assemblies, each first rotating assembly comprising a first rotating bracket;
   a second rotating assembly comprising a second rotating bracket; and
   a connecting member, comprising:
     two first wrapping portions aligned along a first axis, each first wrapping portion defining a through hole along the first axis and being sleeved on a corresponding one of the first rotating brackets tightly; and
     a second wrapping portion coaxial with a second axis, the second axis being perpendicular to the first axis; the second wrapping portion defining a through hole along the second axis and being sleeved on the second rotating bracket tightly, wherein the second rotating bracket comprises a shaft and a pair of second connecting portions extending from opposite sides of the shaft, the pair of second connecting portions comprises two protrusions on opposite sides of the shaft, the second wrapping portion defines a plurality of grooves toward the second rotating bracket, the two protrusions of the second rotating bracket engage in the plurality of grooves of the second wrapping portion.

2. The multi-directional hinge mechanism of claim 1, wherein the connecting member, the first rotating assemblies, and the second rotating assembly are made of plastic material.

3. The multi-directional hinge mechanism of claim 1, wherein each first rotating assembly comprises a first latching member, the first latching member comprises a base and a first latching portion located on an end surface of the base, the first latching portion extends into the corresponding first wrapping portion at the end opposite to the first rotating bracket until the base abuts the end surface of the first wrapping portion.

4. The multi-directional hinge mechanism of claim 3, wherein the base is substantially annular and comprises a restricting protrusion radiating from the base, the base abuts the end surface of the first wrapping portion via the restricting protrusion.

5. The multi-directional hinge mechanism of claim 3, wherein the first latching portion comprises a plurality of claws located on an end surface of the base, the claws and the base cooperatively define a plurality of latching grooves; each first rotating bracket comprises a shaft, and the shaft comprises a second latching portion engaging in the latching grooves.

6. The multi-directional hinge mechanism of claim 5, wherein the first latching portion comprises two positioning blocks located underneath the claws respectively, the second latching portion defines two positioning grooves around an inner wall thereof, the positioning blocks engage with the positioning grooves.

7. The multi-directional hinge mechanism of claim 1, wherein the second rotating assembly comprises a second latching member, wherein the second latching member comprises a base and a latching portion located on an end surface of the base, the latching portion extends into the second wrapping portion at the end opposite to the second rotating bracket until the base abuts an end surface of the second wrapping portion.

8. The multi-directional hinge mechanism of claim 1, wherein each first rotating bracket comprises a shaft and a pair of first connecting portions extending from opposite sides of the shaft, the shaft comprises a first shaft portion and a second shaft portion, the diameter of the first shaft portion is greater than that of the second shaft portion, the shaft further comprises a stepped surface located between the first shaft portion and the second shaft portion, the first shaft portion engages in the first wrapping portion tightly.

9. The multi-directional hinge mechanism of claim 1, wherein the connecting member comprises a base body and a connecting sheet extending from a side of the base body, the two first wrapping portions are disposed on opposites sides of the connecting sheet, the second wrapping portion is located at the far end of the base body, away from the connecting sheet.

10. A multi-directional hinge mechanism, comprising:
two first rotating assemblies, each first rotating assembly comprising a first rotating bracket and a first latching member;
a second rotating assembly comprising a second rotating bracket and a second latching member; and
a connecting member comprising:
two first wrapping portions aligned along a first axis, each first wrapping portion defining a through hole along the first axis and being sleeved on a corresponding one of the first rotating brackets tightly, the first latching member extending into the corresponding first wrapping portion at the end opposite to the first rotating bracket and engaging with first rotating bracket; and
a second wrapping portion coaxial with a second axis, the second axis being perpendicular to the first axis; the second wrapping portion defining a through hole along the second axis and being sleeved on the second rotating bracket tightly, the second latching member extending into the second wrapping portion at the end opposite to the second rotating bracket and engaging with second rotating bracket, wherein the second rotating bracket comprises a shaft and a pair of second connecting portions extending from opposite sides of the shaft, the pair of second connecting portions comprises two protrusions on opposite sides of the shaft, the second wrapping portion defines a plurality of grooves toward the second rotating bracket, the two protrusions of the second rotating bracket engage in the plurality of grooves of the second wrapping portion.

11. The multi-directional hinge mechanism of claim 10 wherein the first latching member comprises a base and a first latching portion, the first latching portion comprises a plurality of claws located on the end surface of the base, the plurality of claws and the base cooperatively define a plurality of latching grooves, each first rotating bracket comprises a shaft, the shaft comprises a second latching portion, the second latching portion engages in the latching grooves.

12. The multi-directional hinge mechanism of claim 10, wherein the connecting member comprises a base body and a connecting sheet extending from a side of the base body, the two first wrapping portions are disposed on opposite sides of the connecting sheet, the second wrapping portion is located at the far end of the base body, away from the connecting sheet.

13. A multi-directional hinge mechanism comprising:
a first rotating assembly comprising a first rotating bracket;
a second rotating assembly comprising a second rotating bracket, the second rotating bracket comprising a shaft and a pair of second connecting portions extending from opposite sides of the shaft, the pair of second connecting portions comprising two protrusions on opposite sides of the shaft; and
a connecting member, comprising:
a first wrapping portion coaxial with a first axis, the first wrapping portion defining a through hole along the first axis and being sleeved on the first rotating bracket tightly; and
a second wrapping portion coaxial with a second axis, the second axis being perpendicular to the first axis; the second wrapping portion defining a through hole along the second axis and being sleeved on the second rotating bracket tightly, the second wrapping portion defining a plurality of grooves toward the second rotating bracket, the two protrusions of the second rotating bracket engage in the plurality of grooves of the second wrapping portion.

14. The multi-directional hinge mechanism of claim 13, wherein the connecting member, the first rotating assemblies and the second rotating assembly are made of plastic material.

15. The multi-directional hinge mechanism of claim 13, wherein the first rotating assembly further comprises a first latching member, the first latching member comprises a base and a first latching portion located on an end surface of the base, the first latching portion extends into the first wrapping portion at the end opposite to the first rotating bracket until the base abuts the end surface of the first wrapping portion.

16. The multi-directional hinge mechanism of claim 15, wherein the base is substantially annular and comprises a restricting protrusion radiating from the base, the base abuts the end surface of the first wrapping portion via the restricting protrusion.

17. The multi-directional hinge mechanism of claim 15, wherein the first latching portion comprises a plurality of claws located on an end surface of the base, the claws and the base cooperatively define a plurality of latching grooves, the first rotating bracket comprises a shaft, wherein the shaft comprises a second latching portion, the second latching portion engages in the latching grooves.

18. The multi-directional hinge mechanism of claim 17, wherein the first latching portion comprises two positioning blocks located on the claws, the second latching portion defines two positioning grooves around an inner wall thereof, the positioning blocks engage in the positioning grooves respectively.

* * * * *